United States Patent [19]

Damme

[11] Patent Number: 5,509,501
[45] Date of Patent: Apr. 23, 1996

[54] DEVICE FOR METERED DELIVERY OF A LIQUID OR VISCOUS SUBSTANCE TO A POINT OF CONSUMPTION

[76] Inventor: Eric V. Damme, 16 Dreve Des Pins, B-1420 Braine L'Alleud, Belgium

[21] Appl. No.: 336,586

[22] Filed: Nov. 9, 1994

Related U.S. Application Data

[63] Continuation-in-part of PCT/EP93/01131, May 9, 1993.

[30] Foreign Application Priority Data

May 10, 1992 [DE] Germany .......................... 42 14 827.8

[51] Int. Cl.⁶ .................................................. F16N 27/00
[52] U.S. Cl. ........................... 184/7.4; 184/27.1; 222/288; 222/309
[58] Field of Search .................................... 184/7.4, 27.1, 184/45.1, 108; 222/288, 309, 333

[56] References Cited

U.S. PATENT DOCUMENTS 2,792,911  5/1957  Harter ........................ 184/7.4
2,856,024  10/1958  Thomas .
2,899,017  8/1959  Liljemark .
3,071,208  1/1963  Rasch et al. ..................... 184/7.4
4,801,051  1/1989  Lewis et al. ..................... 222/309

OTHER PUBLICATIONS

International Search Report.

*Primary Examiner*—Thomas E. Denion
*Attorney, Agent, or Firm*—Anderson Kill Olick & Oshinsky

[57] ABSTRACT

A device for metered delivery of a liquid or a viscous substance to a consumption point, which includes a container for receiving an amount of the substance, a delivery unit having a chamber for receiving the container and a displacement element displaceable between first and second positions for enabling flow of the substance from the container to the consumption point, a connection element which is separate from the delivery unit and is securable to the consumption point, the connection unit having an indicator indicating a predetermined amount of the substance to be delivered to the consumption point in the unit of time, and a control unit for controlling the drive which displaces the displaceable element.

23 Claims, 8 Drawing Sheets

DEVICE FOR METERED DELIVERY OF A LIQUID OR VISCOUS SUBSTANCE TO A POINT OF CONSUMPTION

RELATED APPLICATIONS

This application is a continuation-in-part of International Application No. PCT/EP93/01131, with an international filing date of May 9, 1993 and designating the United States.

BACKGROUND OF THE INVENTION

The present invention relates to a device for metered delivery of a liquid or viscous substance to a consumption point and, in particular, to a device for metered delivery of a liquid or viscous lubricant to a lubrication point.

A regular delivery of a lubricant to lubrication points of machines and apparatuses is an important factor in reliable operation of the machine or the apparatus and in preventing wear of machine or apparatus parts. An interruption in the lubricant delivery can result in a damage of the machine or the apparatus and in increased losses.

Large machines and apparatuses often have many lubrication points which should be lubricated with grease or lubricating oil in accordance with a predetermined lubrication plan. In many machines and apparatuses, even nowadays, the lubrication is effected manually which, on one hand, increases the production costs and, on the other hand, is not very reliable. Therefore, there exists a need for automatization of the lubrication process.

One possible way of solving the problem of automatic lubrication is the use of a central lubrication system which insures delivery of a lubricant to all lubrication points of a machine or an apparatus. However, the use of a central lubrication system means imposing additional limitations on the machine or apparatus design because, with the use of a central lubrication system, as a rule only one lubricant substance is available. Therefore, separate lubrication points cannot be designed in an optimal manner. Further, the use of a central lubrication system increases the investment costs and, because of a rather complicated structure of the central lubrication system, it is not always reliable.

Therefore, numerous devices have been developed for automatic lubrication of each separate lubrication point of a machine or an apparatus. These devices insure delivery of different lubricants to different lubrication points of the same machine or apparatus.

The devices for lubricating separate lubrication points generally includes a cylinder, in which a lubricant is stored and from which the lubricant is delivered slowly by a spring-biased piston, displaceable in the cylinder, through an appropriate orifice. However, the known devices have many drawbacks.

Specifically, when lubricants having a mineral base are used, e.g., such as grease, their viscosity changes with a change in temperature and, to a lesser degree, with a change in pressure. At high temperatures, the viscosity and thereby the flow resistance is reduced so that in the same time period, more lubricant will be delivered to a lubrication point than that at low temperatures. This temperature-dependence can result, at high temperatures, in an early emptying of the device. At low temperatures and, thus, at high viscosity, the delivery of a lubricant can be interrupted.

Another drawback of known devices consists in that the lubricant, during the entire period of the use of the device, which can last several months, is subjected to a spring-biasing force. For many lubricants, such a lasting loading leads to separation of the lubricant components and, in particular, to the separation of an oil containing in grease. This can adversely affect the lubrication characteristics of a lubricant.

A further drawback consists in the dependence of the lubricant delivery on the characteristics of a spring acting on the piston. Because conventionally used springs have an approximate linear characteristic, the spring force with spring expansion is reduced, so that the pressure applied to the lubricant is also reduced. This results in a reduction of the amount of lubricant delivered in a unit of time.

A still further drawback of the known devices consists in that the delivered amount of the lubricant does not depend on mutual interaction between the spring force, viscosity and orifice effective resistance, but depends rather on the flow resistance of the lubricant inside a machine or an apparatus, the flow resistance in the path leading to the lubrication point. This substantially complicates the selection of a correct spring stiffness.

Some of the drawbacks of the conventional lubricating devices are eliminated in a device disclosed in International Publications WO 88/09899 and WO/09900. The device disclosed in these publications includes a chamber for receiving a lubricant and separated by a displaceable insert from another chamber which contains a gas-charging element, for example, a cell consisting of an anode, a cathode and an electrolyte. The gas pressure forces the lubricant through an orifice and provides for flow of the lubricant to the lubrication point.

In the device disclosed in the International publications WP88/09899 and WO88/09900, the negative influence of the spring characteristic of the loading spring on the amount of the delivered lubricant is eliminated. However, in the disclosed device, the amount of the delivered lubricant still depends on the temperature. Further, a danger of the separation of the lubricant components under a constant spring loading still exists.

Another important drawback of the known lubricating device consists in that it is difficult to adapt the lubricant delivery to each lubrication point because separate lubrication points have different requirements for the amount of a lubricant. Therefore, it is necessary to provide a plurality of lubricating devices for accommodating different lubricating requirements. This not only complicates the storage of the devices but presents a danger of mixing the devices, which may result in over- or, which is worse, under-supply of a lubricant to a particular lubrication point.

U.S. Pat. No. 2,856,024 discloses a device for metered delivery of one of a liquid substance and a viscous substance to a consumption point, including a container for receiving an amount of the one of a liquid substance and a viscous substance, delivery means comprising a chamber for receiving the container, a displacement element displaceable between first and second positions for enabling flow of the one substance from the container to the consumption point, and drive means for displacing the displaceable element between the first and second positions.

The device disclosed in U.S. Pat. No. 2,856,024 can be used for a centralized delivery or separate point delivery, and it includes a spring-driven piston, which functions as a displacement element and provides for flow of the lubricant from the container into a lubricant conduit or to the lubrication point. The disclosed device further comprises means for displacing the piston against the spring-biasing force. The displacing means include a shaft driven by a machine drive of a lubricated machine.

An object of the invention is a device for metered delivery of a liquid or viscous substance and which insures a precise metering of a predetermined amount of a lubricant, which corresponds to the requirement of the lubrication point and further insures that a selected amount of the lubricant to be delivered to the lubrication point is maintained substantially constant.

This and other objects of the invention, which will become apparent hereinafter, are achieved by providing a lubricating device, including connection means, which are separate from the delivery means and are securable to the consumption point for communicating the delivery means with the consumption point. The connection means includes an indicator indicating a predetermined amount of the one substance to be delivered to the consumption point in a unit of time. There is further provided control means for controlling operation of the drive means, in accordance with information provided by the indicator, so that the predetermined amount of the one substance is delivered to the consumption point in the unit of time.

The delivery device comprises an energy accumulator which is driven by the drive means against an elastic restoring force from a first position, in which the restoring force is small, to a second position with a high restoring force. The restoring force in the second position of the energy accumulator is so high that it insures flow of the lubricant through the delivery device.

As the energy accumulator, a spring is used. The spring acts on a piston which functions as the displacement member. The piston insures delivery of a precise volume to the lubrication point and, thus, precise metering. The piston advantageously cooperates with a stop which limits the delivery volume. The stop is advantageously adjustable so that the delivery volume can be adapted to particular requirements of the lubrication point.

A further advantage of the inventive device consists in that the delivery volume does not depend on the properties of the deliverable substance and on the environmental conditions of the lubrication point. This enables delivery of the desired amount of the substance in a unit of time.

The important advantage of providing a stop consists in that the stop can be provided in an element separate from the delivery means. In a preferred embodiment of the invention, this separate element is directly connected with the lubrication point, e.g., it can be screwed into the nipple of the lubrication point. When the lubricant container is replaced, this element remains in the machine so that the replacement does not influence the delivery volume.

Using a stop enables to insure, with the use of an appropriate container, a delivery duration, for example, of 100, 200, 300 and 400 days. The stop is adjusted for a desired volume, and the element is screwed into a lubricant inlet of the lubrication point. Thus, it is insured that at each replacement or filling of the container, the same amount of lubricant is delivered to the lubrication point.

The control of the delivery volume per unit of time can be effected by changing the time interval between two successive delivery strokes. In this case, the separate element is provided with an indicator indicating the time interval between two successive delivery strokes. The separate element can also be provided with two indicators, one of which defines the length of the piston stroke and, thus, the delivery volume per stroke, and the other of which indicates the time interval between two successive delivery strokes.

The delivery means and the drive means are so designed that the piston automatically returns from the second position to the first position. This is insured, as it has already been discussed, by providing an energy accumulator in the form of a return spring acting on the piston.

The advantage of using an energy accumulator consists also in that only a short-duration pressure is necessary for delivering the substance from the container. For example, when the time interval between two substance delivery stroke is twelve hours, the substance is subjected to the pressure only for several seconds or minutes daily. This reliably prevents separation of the substance components. In addition, the reliability of the lubrication is increased, and it is possible to admix into the substance component separation-preventing substances.

Further, the return force of the energy accumulator or the spring is always greater than that required for insuring delivery. This insures a rapid delivery of the substance from the container to the lubrication point and eliminates dependence of the delivery on the environmental conditions. If the low temperature prevails and, therefore, the viscosity of the substance is increased, the return force, being high, substantially reduces the substance shear rate. It only means that at low temperatures, for the delivery of a predetermined volume, the delivery time is somewhat increased in comparison with a delivery time at higher temperatures, e.g., from two minutes at a high temperature, to three minutes at a low temperature. However, the volume delivered in a unit of time, in a predetermined time interval, does not increase. The reverse holds true for the delivery at the high temperature.

Because the force used for effecting substance delivery is an elastic return or restoring force, the drive, which operates against this return force, can be relatively small with small dimensions. This means costs reduction and reduction of the dimensions of the overall device.

An electric motor is preferably used as a drive. The electric motor is usually powered by a disposable battery or an accumulator. The device can be so designed that only a small motor power is needed for preloading the energy accumulator.

The device can include a transparent housing or housing parts. This enables an easy visual inspection of the operation of the device and of the amount of the substance in the container.

While the device, according to the present invention, was described with reference to its use as a lubrication device, it can be used, of course, for other purposes where a delivery of a predetermined amount of a liquid or viscous substance is required.

BRIEF DESCRIPTION OF THE DRAWINGS

The features and objects of the present invention will become more apparent, and the invention itself will be best understood from the following detailed description of the preferred embodiments, when read with reference to the accompanying drawings, wherein:

FIG. 1b shows a cross-sectional view of a limiting stop for use in the device shown in FIG. 1a;

DETAILED DESCRIPTION OF THE PREFERRED EMBODIMENTS

Figure 1A:
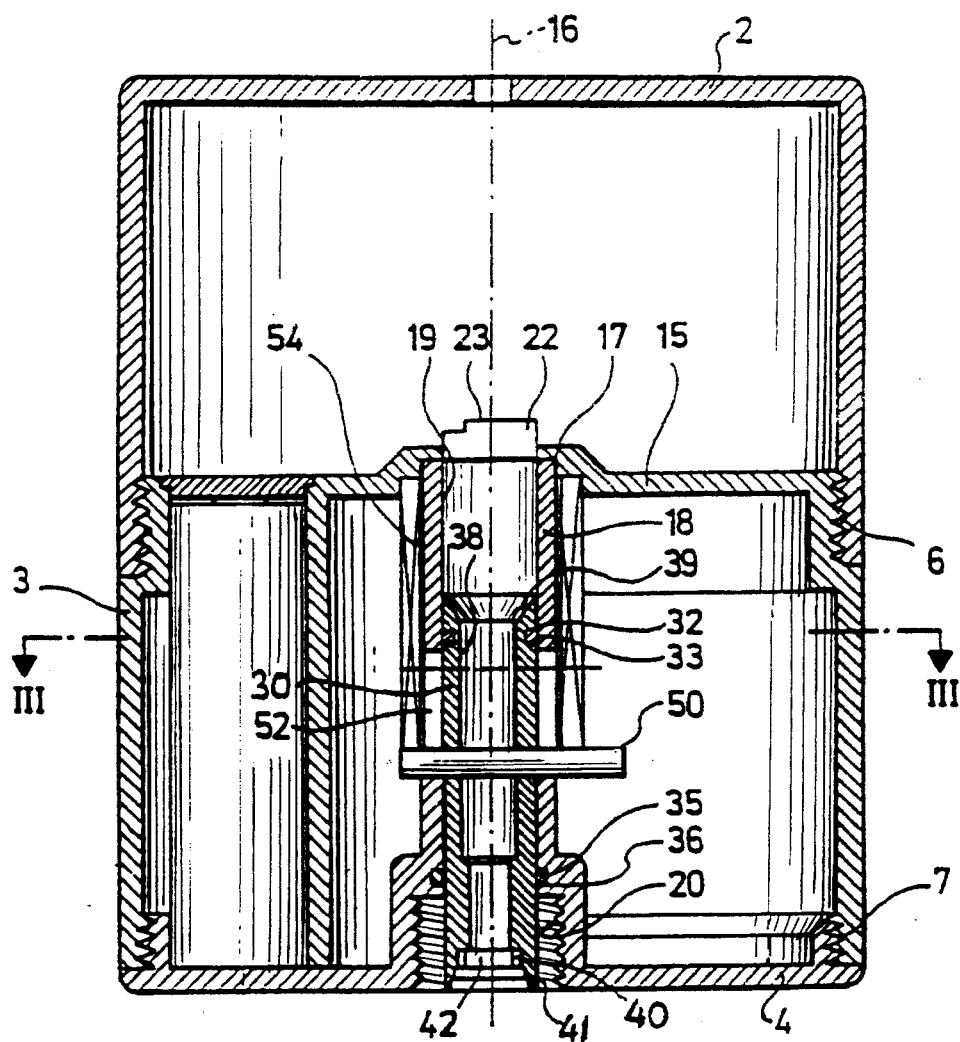
FIG. 1a shows a cross-sectional view of a first embodiment of a device according to the present invention, and which is taken along line I—I in FIG. 3.

The first embodiment of a device for delivering doses of liquid or viscous substances to a consumption point, according to the present invention, will be discussed with reference to FIGS. 1a–4.

The device, different embodiments of which are shown in FIGS. 10–13, is designed for delivering a lubricant, in particular, grease, to a point of greasing and includes appropriate means for adjusting a dose of the grease delivered to the point of greasing.

The lubrication or greasing device shown in FIGS. 1a–3, includes a substantially cylindrical housing having a cover portion 2, a base portion 3, and a bottom 4. The housing is usually formed of a plastic material, preferably of a transparent plastic material. The cover portion 2 and the bottom 4 are connected to the base portion by threaded connections 6 and 7, respectively.

The cover portion 2 has a cylindrical cavity 8 in which a sack 10, made of a plastic material, is located. The sack 10 is designed for storing the deliverable grease. The sack 10 is preferably made of low-density polyethylene. The sack 10 may be purchased from grease suppliers already filled with grease or, alternatively, it can be filled with appropriate grease before being placed in the cover portion 2.

Figure 2:
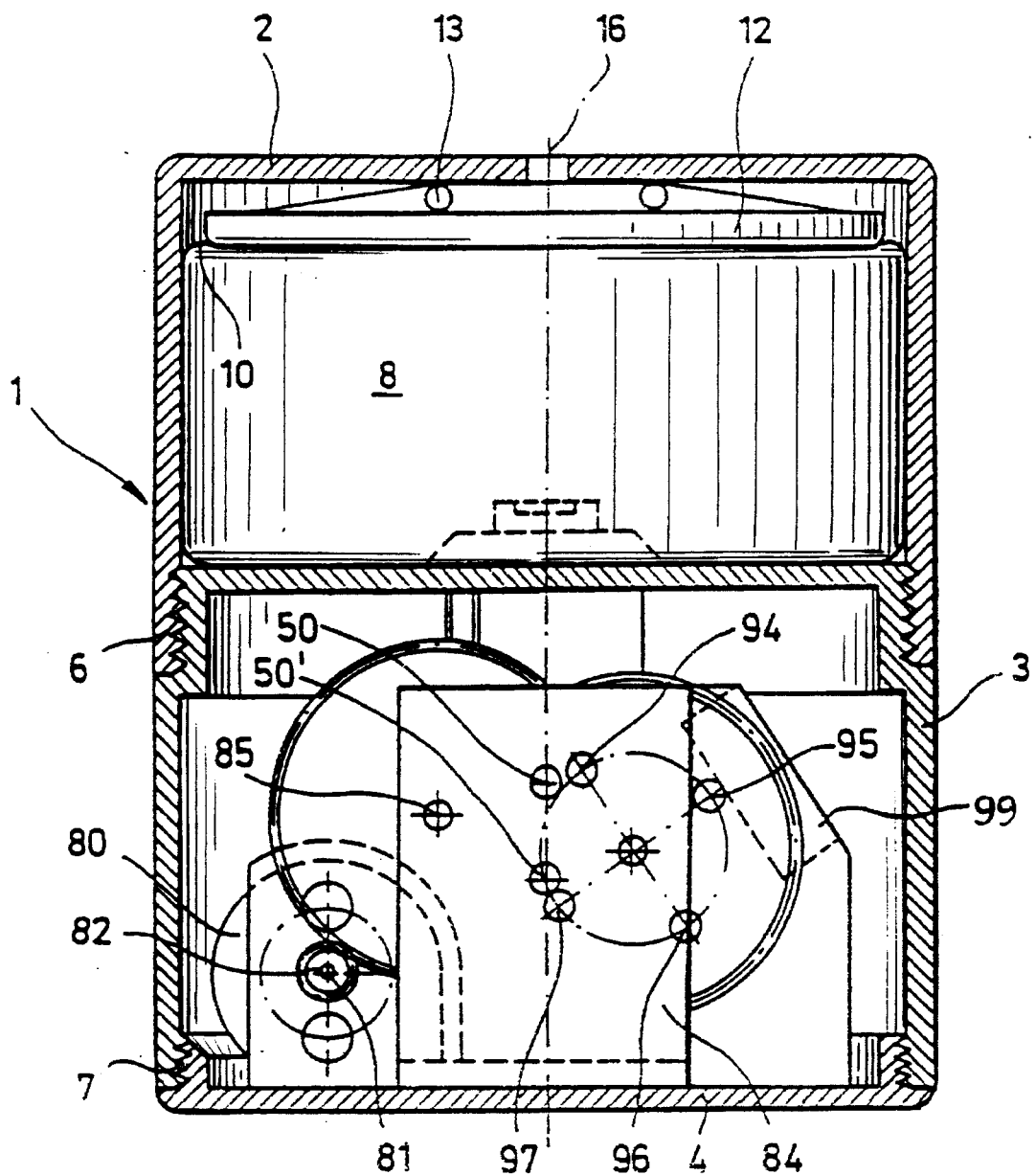
FIG. 2 shows a side cross-sectional view of the device shown in FIG. 1 as viewed in the direction of arrow II in FIG. 3, with the outer housing of the device being partially broken away.

As shown in FIG. 2, the sack 10 can be closed by a plate 12, which is biased against the sack 10 with a conical spring 13 for preloading the grease therein. However, the biasing force of the spring 13 is so calculated that only a small pressure, preferably about 0.5 bar, is applied to the grease inside the sack 10.

The base portion 3, like the cover portion 2, has a substantially cylindrical shape, which is symmetrical with regard to an axis 16. The base portion 3 is provided with an upper circular plate 15, which separates the base portion 3 from the cover portion 2.

The upper plate 15 has a stepped opening 17 in which a tubular member 18, which is formed integrally with the bottom 4, is received. The tubular member 18 is concentric with regard to the axis 16. The tubular member 18 has an inner surface 19 which expands in the low region of the base portion 3 and forms an opening 20. The expanded portion of the inner surface 19 has a thread thereon.

A ring 22 is screwed into or is glued into the upper portion of the opening 17. The ring has a sharp upper edge 23. The ring 22 is designated for cutting the plastic sack 10, which contains the grease, when the cover portion 2 is screwed to the base portion 3.

A hollow piston 30 reciprocates within the tubular member 18. The hollow piston 30 has, in its upper and lower regions, annular grooves 32 and 35, respectively, in which sealings 33 and 36 are located, respectively. The sealings 33 and 36 seals the piston 30 against the inner surface 19 of the tubular member 18.

The piston 30 has an inner through-bore 38 which expands toward cover portion 2 forming a conical opening 39. In the lower region of the piston 30, the through-bore 38 forms first and second progressively expanded openings 40 and 41. A cylindrical sealing plate 42 is provided in the first opening 40. The sealing plate 42 is formed either of a resin or a plastic material. The sealing plate 42 is biased by a spring (not shown) against an upper shoulder surface defining the opening 40.

The piston 30 has a transverse bore in which a pin 50 extends. The pin 50 is secured in the transverse bore of the piston by, for example, by being glued therein. The axis of the pin 50 forms an angle of 90° with the axis 16 of the device.

The tubular member 18 has, in the plane of FIG. 1a, an opening 52 which is so arranged that the piston 30, together with the pin 50, can be displaced upward and downward inside the bore of the tubular member 18 which is defined by the inner surface 19.

A spring 54 is provided between the separation plates 15 and the pin 50. The upper end of the spring 54 is received in a lower portion of the stepped opening 17.

Figure 1B:
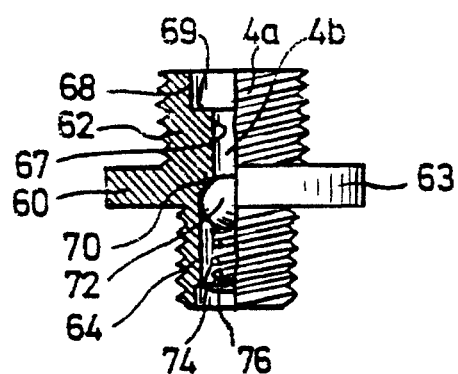

FIG. 1b shows a limiting stop 60 having a first thread union 62 having an outer thread which cooperates with the inner thread of the opening 20 for securing the limiting stop 60 in the base portion 3. A hexagonal flange 63 facilitates screwing of the stop 60 into the opening 20. The limiting stop 60 has, on the other side of the flange 63 remote from the first socket 62, a second thread union 64, the dimensions of which are so selected that it can be screwed into a machine bore designated for receiving a grease nipple.

The limiting stop 60 has a through-bore 67 having a widened cylindrical portion 68 which is located in the first thread union 62. The diameter of the widened portion 68 of the bore 67 is at least somewhat bigger than the outer diameter of the piston 30. The widened portion 68 of the bore 67 defines a stop shoulder 69.

Somewhat in the region of the flange 63, the bore 67 has a conical enlargement 70 in which a steel ball 72 is engaged. The ball 72 is biased into engagement with the conical surface defining the bore enlargement 70 by a spring 74, which is supported against a ring 76 screwed into the bore 67. The conical enlargement 70, the ball 72 and the spring 74 form together a ball valve.

Figure 3:
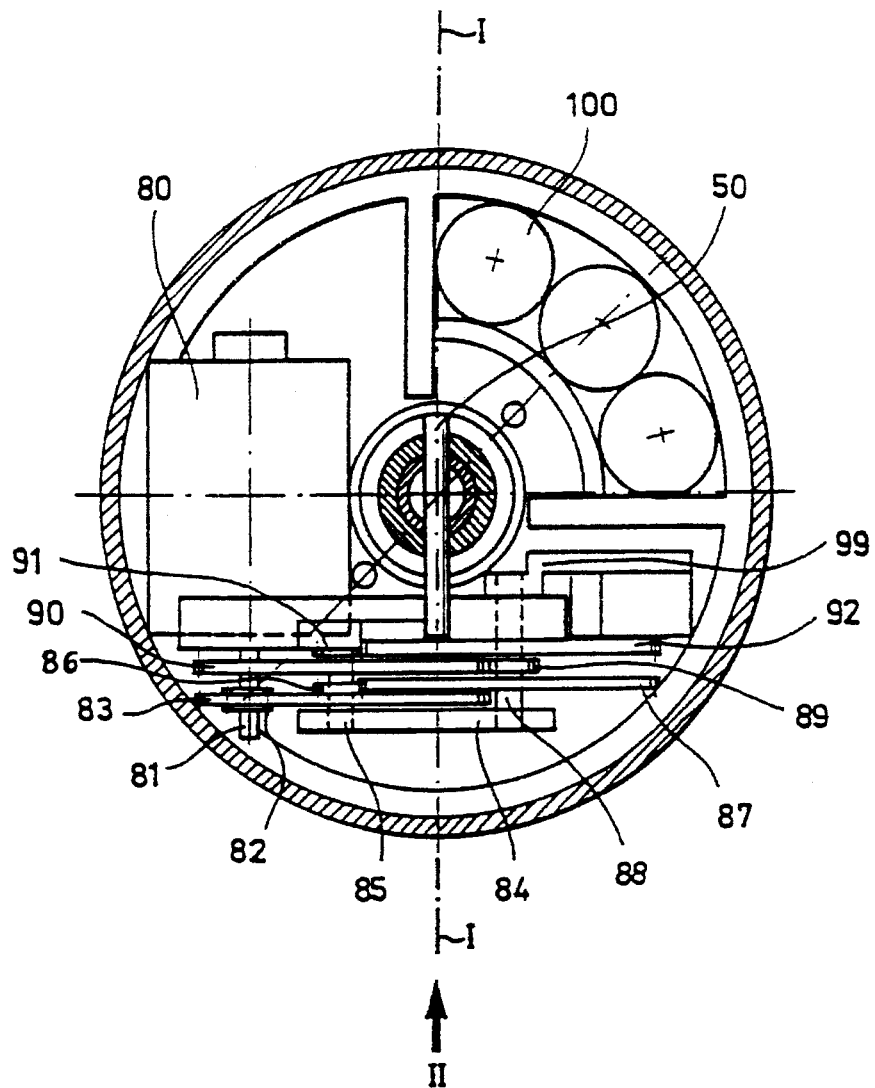
FIG. 3 shows a plan cross-sectional view of the device taken along line I—I in FIG. 1.

As shown only in FIGS. 2 and 3, an electromotor 80 is located in the base portion 3, with the drive shaft 81 of the electromotor 80 extending parallel to the axis of the pin 50. A drive pinion 82 is secured on the drive shaft 80 which cooperates with a first gear 83 supported on an axle 85 secured in a bracket 84. A second pinion 86, arranged concentrically with the first gear 83, is secured to the first gear 83 for joint rotation therewith.

The rotation of the pinion 86 is transmitted to a second gear 87 which is supported on a shaft 88 likewise secured in the bracket 84. A third pinion 89, arranged concentrically with the second gear 87 and secured thereto for joint rotation therewith, is also supported on the shaft 88.

The third pinion 89 drives a third gear 90 whose movement is transmitted to a fourth pinion 91, which is arranged concentrically with the third gear 90. The movement of the fourth pinion 91 is transmitted to a fourth gear 92 which is rotatably supported on the shaft 88.

As shown in FIG. 2, four cylindrical push pins 94,95,96 and 97 are secured on the fourth gear 92. The outer diameter of the push pins 94,95,96,97 is approximately equal to the outer diameter of the pin 50. The push pins 94,95,96,97 lie on a circle, the center of which lies on the rotational axis of the fourth gear 92. The push pins 94,95,96 and 97 are arranged at an angle of 90° relative to each other. The pin 50, the gears, the pinions, and the push pins are formed preferably of metal, in particular, of steel.

Parallel to the rotational plane of the fourth gear 92, there is provided an electrical switch 99 which is actuated by the push pins 94,95,96 and 97. Three batteries 100 are provided in the base portion 3 for supplying energy for operating the electric motor 80.

Figure 4:
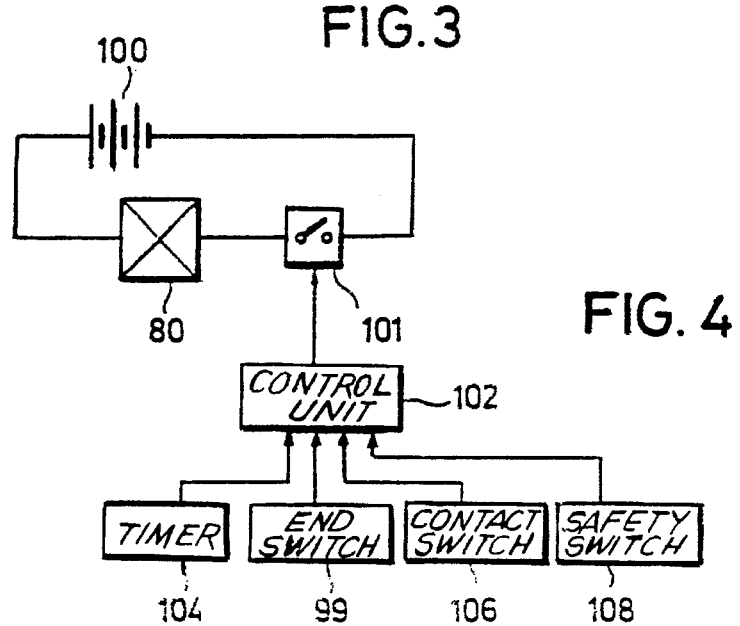
FIG. 4 shows a control block-diagram of the device shown in FIG. 1.

The lubrication device shown in FIGS. 1a–3 is controlled by a control unit, an electrical circuit block diagram of which is shown in FIG. 4. A switch relay 101 communicates the batteries 100 with the motor 80.

A control unit 102 receives signals from a timer 104, the end switch 99, a manual contact switch 106 which, preferably, is secured on the base portion 3 (not shown there) and is externally actuated, and a safety switch 108, which is secured on the bottom 4 (not shown there) and which is turned on when the limiting stop 60 is screwed into the opening 20.

The lubrication device shown in FIGS. 1a–3 operates as follows:

The device shown in FIGS. 1a–3 is designed for receiving a sack 10 filled with 150 mm of lubricant grease. Of course, the lubrication device can be designed for a bigger or smaller grease volume. Assuming the volume is 150 mm, the limiting stop is so selected that (for the device of FIGS. 1a–3), that with two lubrications of the lubrication point daily, a desired amount of grease is delivered to the point of lubrication.

First, a second thread union 64 of the selected limiting stop is screwed into a corresponding lubrication bore of a respective machine element, and then the lubrication device is screwed onto the first thread union 62 of the limiting stop 60, with the bottom 4 being screwed onto the first thread union 62. Then, a new or refilled sack 10 is placed on the plate 15 of the base portion 3, and the cover portion 2 is screwed to the base portion 3. At that, the ring 22 cuts through the sack 10, whereby the sack 10 communicates with the bore 19 of the tubular member 18 and the bore 38 of the hollow piston 30.

With each replacement of the grease material, the batteries 100 are also replaced or the accumulators, if used instead of batteries, are charged anew. The safety switch 108 is actuated, upon the device being screwed onto the thread union 62 of the limiting stop 60.

The timer 104 is so adjusted that it sends a pulse to the control unit 102 exactly every twelve hours. In response to the pulse received from the timer 104, the control unit 102 actuates the switch relay 101 which, upon actuation, provides for current flow to the motor 80. The motor 80 starts to rotate and drives the fourth gear 92 through a reducing gear, which consists of first, second, third and fourth pinions and first, second and third gears. The fourth gear 92 rotates, rather slowly, in a clockwise direction.

The rotation of the gear 92 causes rotation of push pins 94, 95,96,97. As shown in FIG. 2 with regard to the push pin 97, the push pins, upon rotation of the gear 92, contact the pin 50 secured in the piston. In FIG. 2, the pin 50 is shown twice with its lower and upper end positions being designated, in FIG. 2, with numerals $50^1$ and 50.

The push pin, upon contacting the pin 50, causes its displacement along the device axis 16 upward in a vertical direction. As soon as the pin 50 reaches its upper end position shown in FIG. 2, the push pin which brought the pin 50 to that position, disengages from the pin 50, as shown in FIG. 2 with regard to the push pin 94. Simultaneously, a push shift 95, which is spaced from the push pin 94 in the rotational direction, contacts the end switch 99 which, upon contact, sends a pulse to the control unit 102.

The control unit 102, upon having received the pulse from the end switch 99, interrupts the flow of current to the motor 80 and stops the drive mechanism. The displacement of the pin 50 upward causes compression of the spring 54.

Because the inside cavities of the piston 30 and the tubular member 18 are always completely filled with the grease due to the action of the spring 13 and a high vacuum existing in the cylindrical portion 68, the grease is supplied into the bore 19 when the piston 30 moves upward. The filling of the bore 19 with the grease takes place, with the flap valve formed by the plate 42 being open, and the grease flow into the widened portion 68 of the limiting stop. As soon as the piston 30 reaches its upper position, the suction of the grease stops, and the flap valve closes.

The action of the spring 54, which functions as an energy accumulator, causes displacement of the pin 50, together with the piston 30, downward to their initial position. At that, the grease in the widened portion 69 is displaced downward, opening the ball valves 70,72 and 74 so that the grease can flow to the lubricated machine element.

Under the action of the spring 54, the piston 30 is displaced downward until the lower end surface of the piston 30 engages the shoulder 69 of the widened portion 68. Thus, the shoulder 69 forms a stop for the piston 30. The device remains in this position until the timer 104 generates the next time pulse, and a next delivery stroke is initiated.

Because the movement of the piston 30, which is caused by the spring 54, can take place during a rather long period of time, arbitrarily selected, the delivered volume depends only on the piston stroke and not on other parameters, e.g., on the viscosity of the lubricating grease, which changes with a change in temperature. At a low temperature, that is, when the viscosity of the grease is high, a time period, required for the return of the piston to its initial position, is selected to be longer.

Further, the delivered grease volume does not depend on the flow resistance in the lubricated machine part, because the biasing force of the spring is selected to apply an adequate pressure to the grease. The spring dimensions are generally selected such that a pressure force of about 20 bar is obtained.

The power of the motor 80 is so selected that the produced movement not only insures the compression of the spring 54 to an appropriate degree, but also provides for the displacement of the piston 30 at low temperatures and, thus, high viscosities, from the initial position of the piston to the piston grease delivery position.

Providing a motor with adequate power is facilitated by the fact that the current path in the device is short and rectilinear and that the flow cross-section of the grease in the device is relatively large and, therefore, the flow resistance inside the device is relatively small.

Because the device housing is transparent, the operation of the device can be controlled from outside. Additionally, the provided safety switch 106 can be manually operated at any time during the delivery process. This enables to effect a control run of the delivery process and to watch, through the transparent housing walls, the course of the delivery stroke.

Particular advantages can be achieved by appropriate selection of the limiting stop. The length of the cylindrical widened portion 68 of the opening 67 and, thus, the position of the stop shoulder 69 can be so selected that the grease volume, which is delivered by one stroke, can exactly correspond to a predetermined volume.

If, for example, a grease volume of 150 mm placed in the sack 10 should be delivered by two hundred delivery strokes (during one hundred days, with two delivery strokes daily, every twelve hours), the widened cylindrical portion 68 of the bore 67 will be dimensioned to insure delivery of 0.75 cm$^3$ per stroke. If a larger or smaller amount per stroke is required, the length of the portion 68 is correspondingly changed, with the shoulder 69 being displaced lower (for a larger amount) or higher (for a smaller amount).

When the lubricating device is changed, the limiting stop remains in the lubricated machine part and a new device is screwed onto the limiting stop. Thereby, with the replacement of the lubricating device, the delivery stroke volume, which has been determined by the selection of the limiting stop, does not change, and an adjustment error of the operation force is excluded.

Furthermore, the limiting stops, corresponding to different delivery volume, can be marked with different colors. Thus, looking at the limiting stop, one can easily find out what delivery volume has been selected for a respective point of lubrication, or how many days the grease is supplied to the lubrication point.

It is of great importance in manufacturing the inventive device to insure that the upper end position of the piston stroke, i.e., the upper deadpoint, is always the same. In this case, the lower end position and thus, the piston stroke volume, is determined by the limiting stop. This insures a precise metering of a delivered volume, without changes in the device itself. The piston displacement means, which includes cooperating pin 50 and the push pins 94,95,96,97, functions independently of the position of the end stop. This also provides for a simple and, at the same time, a very precise metering of the delivery volume without a need in any adjustment.

A second embodiment of the lubricating device according to the present invention, will be described with reference to FIG. 5.

Figure 5:
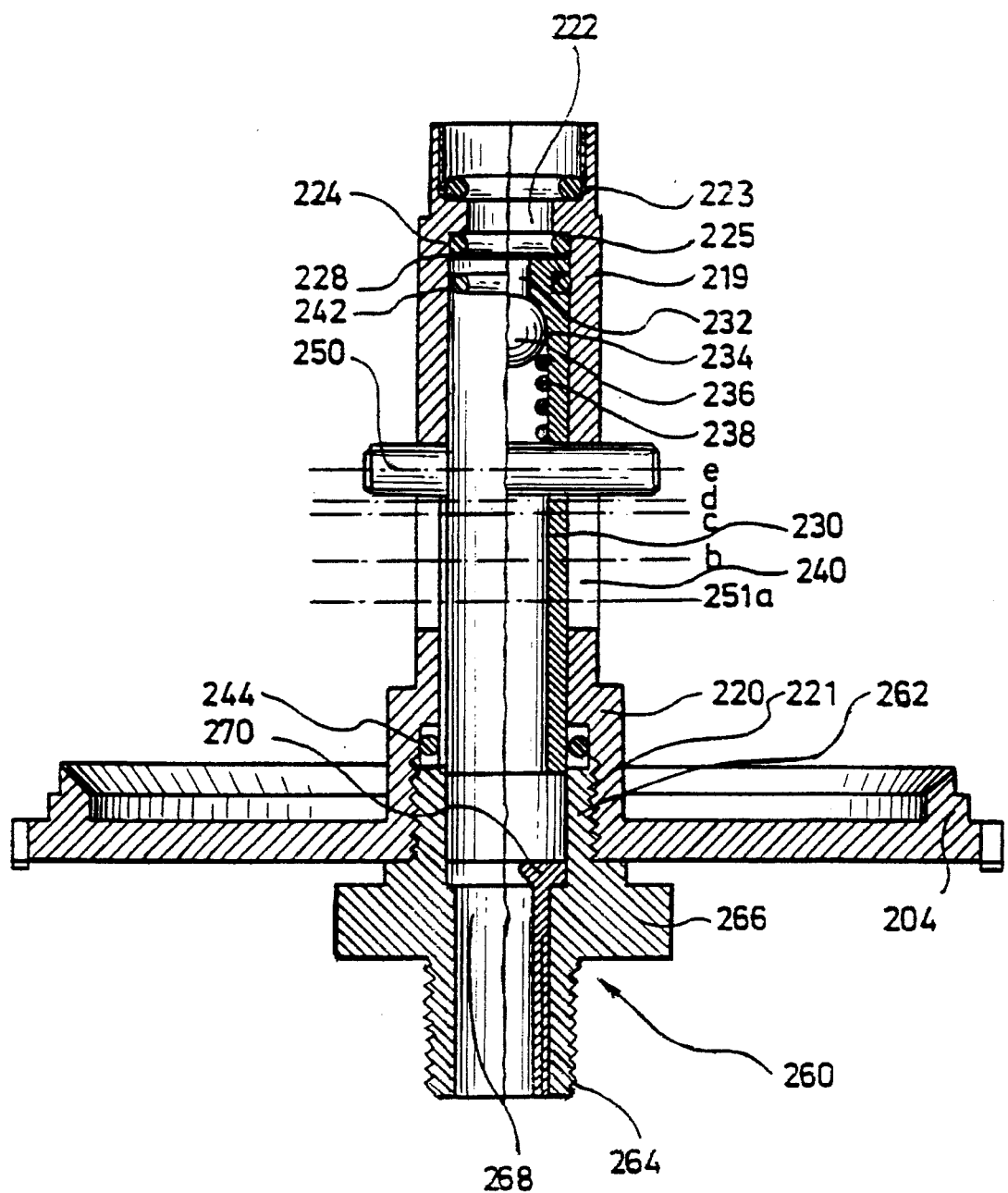
FIG. 5 shows a partial cross-sectional view of a second embodiment of a device according to the present invention.

In the embodiment of FIG. 5, the cover and base portions, as well as other elements which are not shown, are formed in the same manner as respective elements of the embodiment shown in FIGS. 1a–3. In the embodiment of FIG. 5 as in the embodiment of FIGS. 1a–3, the bottom 204 is formed integrally with a tubular member 219, the lower expanded portion 220 of which has a thread 221 for receiving a first thread union 262 of a limiting stop 260. The upper portion of the tubular member 219 cooperates with a container such as, for example, is shown in FIG. 11, or such as shown in FIG. 2.

Figure 11:
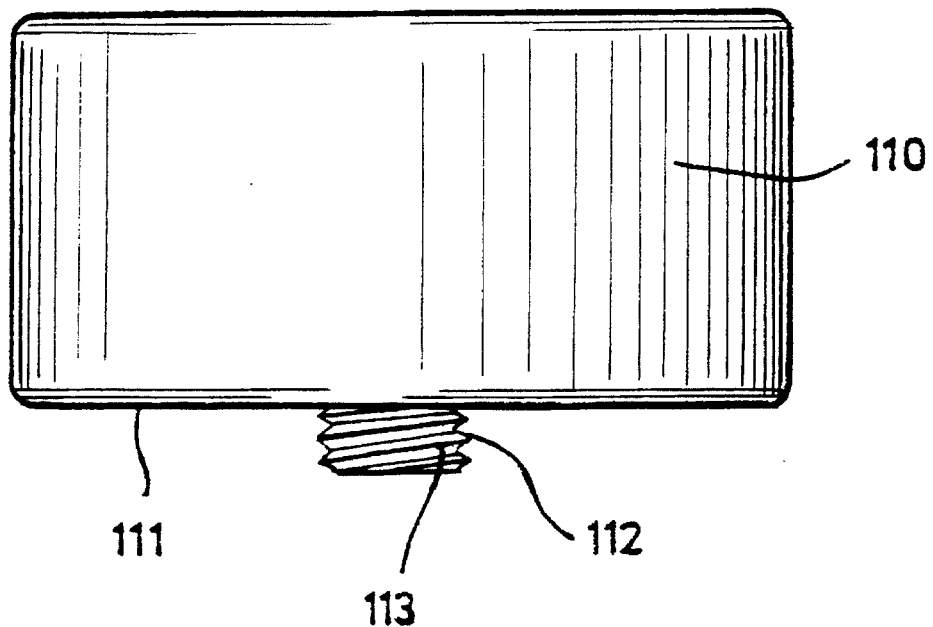
FIG. 11 shows a side view of a lubricant container for use in the device shown in FIG. 1.

In the embodiment shown, the use of the container shown in FIG. 11 is contemplated. For sealing of the container against the bore of the tubular member 219, sealings 223 and 225 are provided at respective annular surfaces 222 and 224 of the tubular member 219. A plate 228 is arranged beneath the sealing 225. The plate 228 functions as a plate valve, the structure and operation of which are not disclosed in detail.

A cylindrical piston 230 reciprocates in the bore of the tubular member 219. The piston 230 has, in its upper region, a through-bore 232 which is joined, from beneath, by a spherical cavity 234 in which a ball 236 is received. The ball 236, together with the spherical cavity 234 and the bore 232, form a ball valve. A cylindrical spring 238 biases the ball 236 into the spherical cavity 234 so that the ball 236 blocks the bore 232.

The spring 238 is supported on a cylindrical pin 250, the function of which is similar to that of the pin 50 in the embodiment of FIGS. 1a–3. The pin 50 extends through the side surfaces of the piston 230 and is displaceable in an elongated slot 240 of the tubular member 219. The piston 250 is sealed against the tubular member 219 with two 0-rings 242 and 244 arranged in respective recesses in the upper and lower regions of the piston 250.

For limiting the stroke of the piston 250, there is provided the limiting stop 260, which is screwable into the bottom 204. The limiting stop is similar to that of the embodiment of FIG. 1b. The limiting stop is provided, as that of FIG. 1b, with a second thread union 264 screwable into a lubricating bore of an appropriate machine part. The screwing-in is facilitated by the use of a hexagonal flange 266. The limiting stop has a through-bore 268 through which a grease substance is delivered. A separate stop 270 is provided for limiting the stroke of the piston 230.

The device shown in FIG. 5 operates as follows:

A cover portion (not shown) which contains the grease container (sack) is brought into communication with the tubular member 219, and the grease, under action of a preloading spring, flows into the tubular member 219. The shift 250 moves upward by motor and drive means, which were described with reference to the embodiment shown in FIGS. 1a–3. Thereby, the plate valve remains closed.

The grease, which is located in a space beneath the plate valve and in the bore 232, applies pressure to the ball 236 forcing it downward, so that an intermediate space between the spherical cavity 234 and the ball 236 opens, and the grease can flow into the piston.

As soon as the piston 230 reaches its upper deadpoint, the ball valve closes, and the piston 230 is forced to move in a direction toward the limiting valve 260 under the action of the preloaded spring (not shown) in a manner described with reference to the embodiment of FIGS. 1a–3. As a result of the downward movement of the piston 230, the grease, which is located in the piston, flows into the bore 268 and to a point of lubrication.

During the downward displacement of the piston 230, a vacuum is formed in the region of the bore 232. This vacuum results in an opening of the plate valve. The vacuum which is formed by outflow of grease, causes further flow of grease into the piston. Under the action of the spring 238, the piston 230 moves downward until its lower end surface engages the stop surface 270.

By an appropriate selection of the stop, different lengths, designated in FIG. 5 by dash-dot lines a,b,c,d,e of the piston stroke, can be established. The grease volume delivered per piston stroke also changes with a change of the piston stroke length.

Different limiting stops can be used for obtaining desired lengths of the piston stroke. Because the limiting stop during the device replacement remains in the lubricated machine part, it automatically determines the amount of the lubricant grease that is delivered to the point of lubrication per unit of time.

The advantage of the embodiment, which is shown in FIG. 5 in comparison with that of FIGS. 1a–3, consists in that the path necessary for suction of the grease is reduced. Therefore, because of the smaller flow path of the grease and because of the resulting small flow resistance, and further because of the downward movement of the piston, a stronger vacuum is generated, and even at very low environmental temperatures, a sufficient amount of grease can be delivered by the piston in a chamber formed thereby.

For the rest, the functioning of the embodiment shown in FIG. 5 remains the same as of the embodiment of FIGS. 1a–3.

A third embodiment will be described with reference to FIG. 6. This embodiment, except the shapes of the cylindrical tubular member and of the piston displaceable therein, is similar to the embodiments of FIGS. 1a–3 and FIG. 5.

Figure 6:
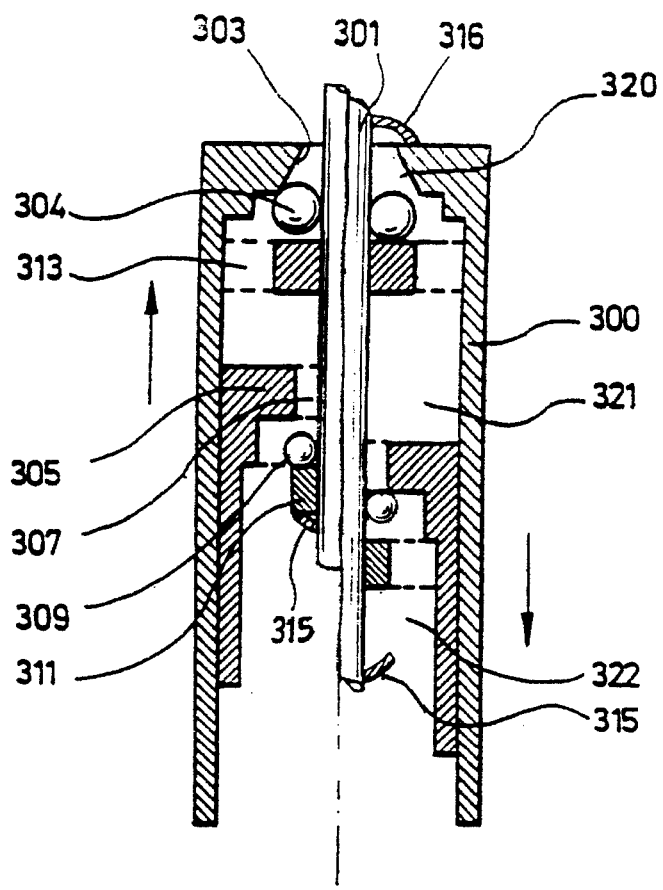
FIG. 6 shows a partial cross-sectional view of a third embodiment of a device according to the present invention.

In the embodiment shown in FIG. 6, a cylindrical control rod 301, which is formed of steel or a plastic material, is displaceable inside the cylindrical tubular member 300. The tubular member 300 has, in its upper portion, a conical opening 303, which expands toward the middle of the tubular member and through which the grease from a grease container (not shown), flows into the tubular member 300. The conical surface of the opening 303 simultaneously serves as a stop (seat) for a valve ring 304 having a circular cross-section.

In FIG. 6, the piston 305 is shown in two positions with the left half showing the suction stroke and the right half showing the delivery stroke.

The piston 305 has a through-bore 307 the diameter of which is larger than the diameter of the control rod 301. The bore 307 is closed with a valve ring 309 which is supported, on one side, against the inner wall of the piston 305 and, on the other side, against a ring 311. The ring 111 is displaceably supported on the control rod 301.

There is further provided a second ring 313 in the upper portion of the tubular member 300. The second ring 313 is fixedly secured to the tubular member 300 by, e.g., a web. The ring 313 serves as a stop for the valve ring 304. Lower and upper stops 315 and 316 are provided on the control rod 301.

The device, the embodiment of which is shown in FIG. 6, operates as follows:

As in the embodiment of FIG. 5, the cooperating cylindrical tubular member, piston and valve rings form three chambers, namely, a first chamber 320, which communicates with the inside of the grease container, and second and third chambers 321 and 322.

Upon movement of the piston 305 upward, as shown in the left half of FIG. 6, the piston bottom is lifted from the valve ring 309 and grease can flow from the chamber 321 into the chamber 322. Because the movement of the piston 305 upward is insured by a motor, a sufficient drive torque for compensating the grease viscosity is available.

During the upward movement of the piston 305, the valve ring 304 remains closed, whereby flow of the grease back into the container is prevented.

As soon as the piston 305 reaches its upper deadpoint, the electrical drive is turned off, and the piston 305 moves downward under an action of a spring (not shown). As a result of the downward movement of the piston 305, the clearance between the bottom of the piston 305 and the valve ring becomes closed, and the grease flows likewise downward to the point of lubrication. The movement of the piston 305 downward results in reduction of pressure in the chamber 321.

The reduced pressure in the chamber 321, together with the frictional forces generated by the likewise downward movement of the control rod 301, provide for lifting of the valve ring 304 from its stop 313. As a result, the chamber 320 again communicates with the chamber 321 and the grease can flow from the chamber 320 into the chamber 321. This grease flow is insured by the action of a spring, similar to the spring 13 shown in FIG. 1a, which acts on the container.

The advantage of the embodiment shown in FIG. 6 consists in that the suction path between the container and the chamber 320 is minimized so that even at low temperatures, excellent flow characteristics of the grease are obtained.

Figure 8:
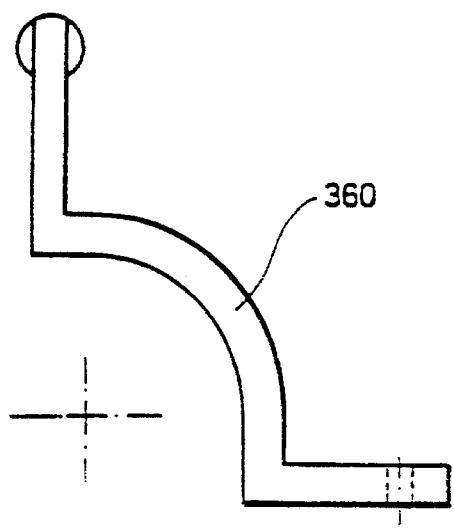
FIG. 8 shows a side view of a lever for use in the device shown in FIG. 7.
Figure 7:
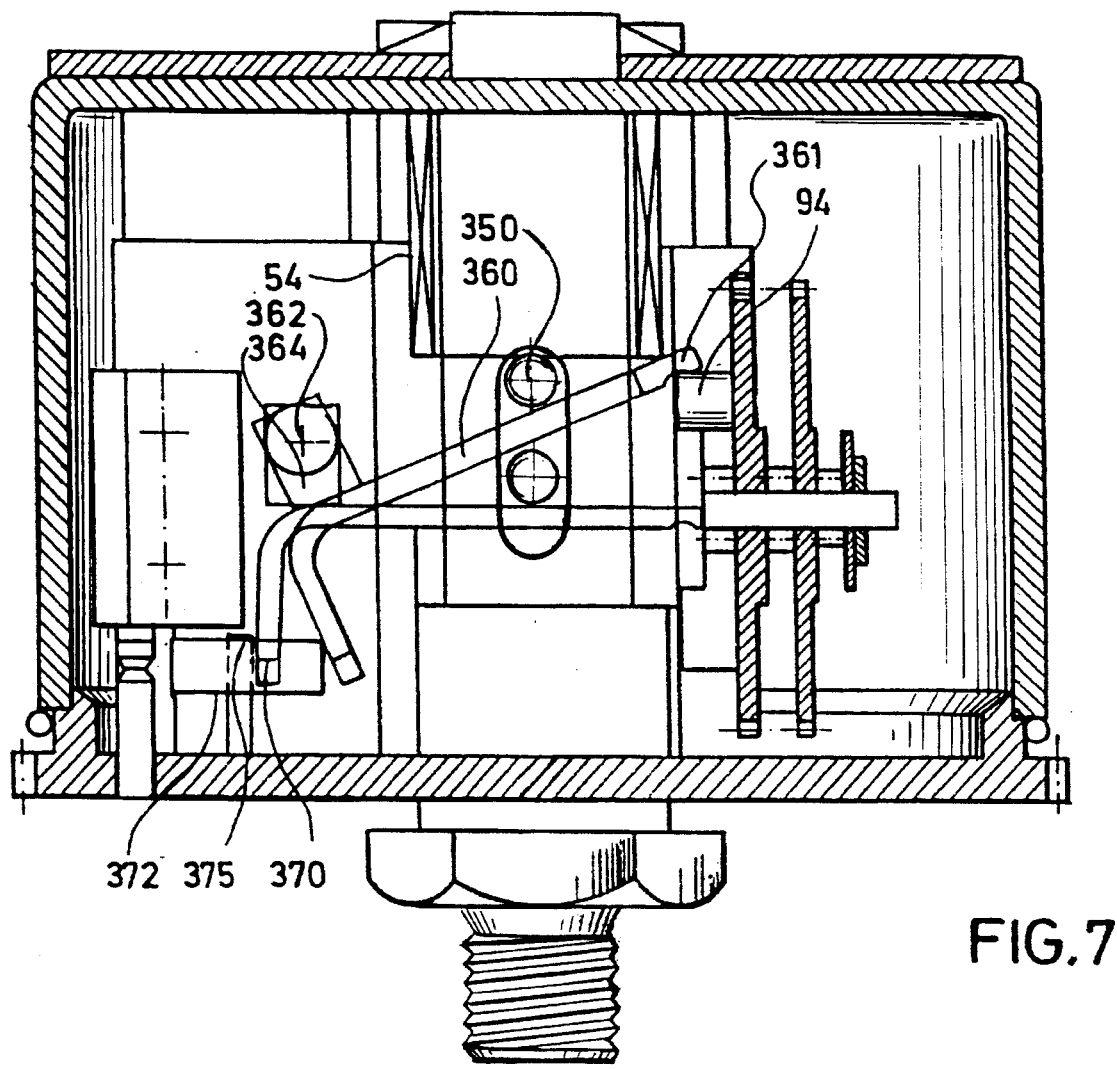
FIG. 7 shows a partial cross-sectional view of a fourth embodiment of a device according to the present invention.

A fourth embodiment of the device according to the present invention is shown in FIGS. 7 and 8.

The design of the device shown in FIG. 7 and 8 is similar to the design of the devices shown in FIGS. 1a–6. The device of FIGS. 7 and 8 differs from those described previously in a manner in which the pin 350, which corresponds to the pin 50 or 250 of the first and second embodiments, moves upward. In the embodiment of FIGS. 7 and 8 as in the embodiment of FIGS. 1a–3, there are provided four push pins 94 and a drive for rotating the same.

However, in contrast to the embodiment shown in FIGS. 1a–3, in the embodiments of FIGS. 7 and 8 the push pins do not act directly on the pin 350. For displacement of the pin 350, there is provided a lever 360 which is rotatably supported on an axle 362. A plate 364 connects the lever 360 with the axle 362.

At the front end of the lever 360, which cooperates with the push pins 94 for displacing the pin 350, there is provided an indent portion 361. Providing the indent portion 361 facilitates the engagement of the lever 360 with the push pins 94.

The lever 360 has a shape resembling a right angle, with the bent-out portion 170 being connected by a tension spring 372 with a stationary part. As shown in FIG. 8, the lever 360 has an arched shape. The arched shape of the lever 360 permits the lever to be placed around the tubular member, which is similar to the tubular member 18 or 219, shown in FIGS. 1a–3 or 5. In the lower position, the lever 360 engages, as shown in FIG. 7, an end switch 375.

The device shown in FIG. 7 operates as follows:

As soon as the motor (not shown) is actuated, the gear which supports the push pins 94 starts to rotate, and the push pins 94 move along a circular path upward. Upon moving upward, the push pin 94 contacts the horizontally-lying lever 360, as shown in the lower portion of FIG. 7. The push pin 94 moves the lever 360 upward, whereby the pin 350 is simultaneously moved upward. Upon moving upward, the lever 360 pivots about the axle 362.

Upon being lifted a certain distance, the lever 360 disengages from the push pin 94 and falls down. When the lever 360 moves downward, the tension spring 372 biases the lever 360 into engagement with the end switch 375. The end switch generates a contact signal which is communicated to the control unit which turns the motor off.

A fifth embodiment of the device according to the present invention will be described with reference to FIG. 9.

Figure 9:
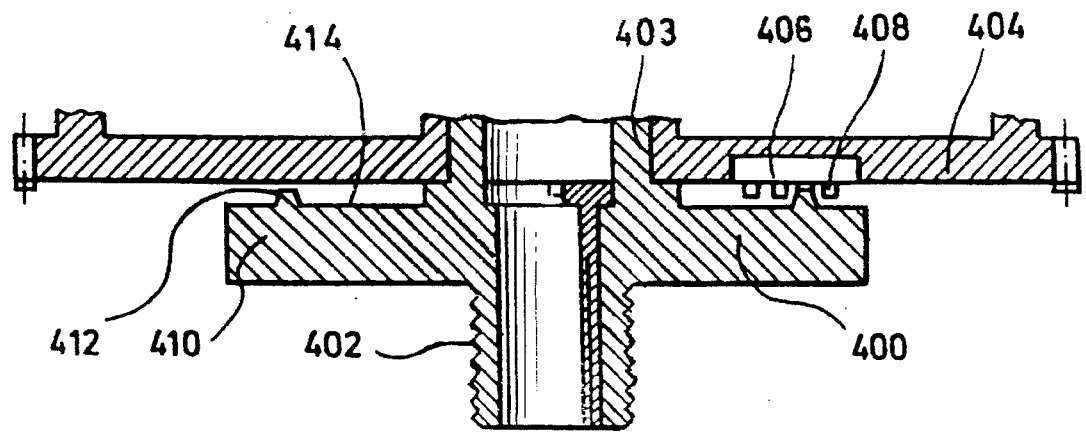
FIG. 9 shows a partial cross-sectional view of a fifth embodiment of a device according to the present invention.

The device shown in FIG. 9 includes a connection member 400 that functions as the limiting stop 60 or 260 shown in FIGS. 1b or 5. The connection member 400 has a cylindrical projection 402 having an outer thread, with which the connection member 400 is screwed into a lubrication bore of a machine part.

The connection member 400 has a second cylindrical projection 403 (shown only partially) also provided with an outer thread for attaching the connection member to the bottom 404, which is similar to the bottom 4 of FIG. 1a and the bottom 204 of FIG. 5. However, in contrast to the embodiments of FIGS. 1a and 5, in the embodiment of FIG. 9 an indexing mechanism 406 is provided in the bottom 404. The indexing mechanism 406 has four microswitches 408 located next to each other.

The connection element 400 has a flange 410 with an annular ring 412 formed on the upper surface 414 thereof, and projecting upwards from the upper surface 214.

The device shown in FIG. 9 operates as follows:

The connection member 404 is screwed into the lubrication bore of the lubricated machine part with its lower projection 402. Then, the device is screwed onto the upper projection 403. At that, the projecting ring 412 contacts the third microswitch when counting from inside.

The control unit, which is similar to that shown in FIG. 4, interrogates the position of the indexing device to establish the time interval between the piston stroke actuation. This time period changes in accordance with which of the four microswitches are actuated.

Thus, the microswitches effect the control of the time interval between the piston strokes. Thus, a microswitch position 1 to 4 corresponds to one, two, three or four delivery strokes per twenty-four hours.

Because the connection member 400 remains in the lubricated machine part in the same way as the limiting stops 60 or 260, a correct time interval is automatically retained after each replacement of the lubricating device.

The time interval control, which is discussed with reference to the embodiment of FIG. 9, is equally applicable to the limiting stops 60 and 260 of FIGS. 1a and 5.

If an indexing device with three microswitches which generate one, four or sixteen pulses per day is used, together with a piston the stroke of which is changeable in three stages of 0.25 cm$^3$, the following combinations are possible:

| Delivery Stroke/Day | Stroke Volume in cm$^3$ | Day Volume in cm$^3$ |
| --- | --- | --- |
| 1 | .25 | .25 |
| 1 | .05 | .05 |
| 1 | .75 | .75 |
| 4 | .25 | 1 |
| 4 | .05 | 2 |
| 4 | .75 | 3 |
| 16 | .25 | 4 |
| 16 | .05 | 8 |
| 16 | .75 | 12 |

Accordingly, by changing the time interval and varying the piston stroke, the grease delivery can be easily varied from a small amount to a large amount without any problems.

The correct delivery volume is established when the lubricating device is mounted on the connection member which remains in the lubricated machine part.

Figure 10:
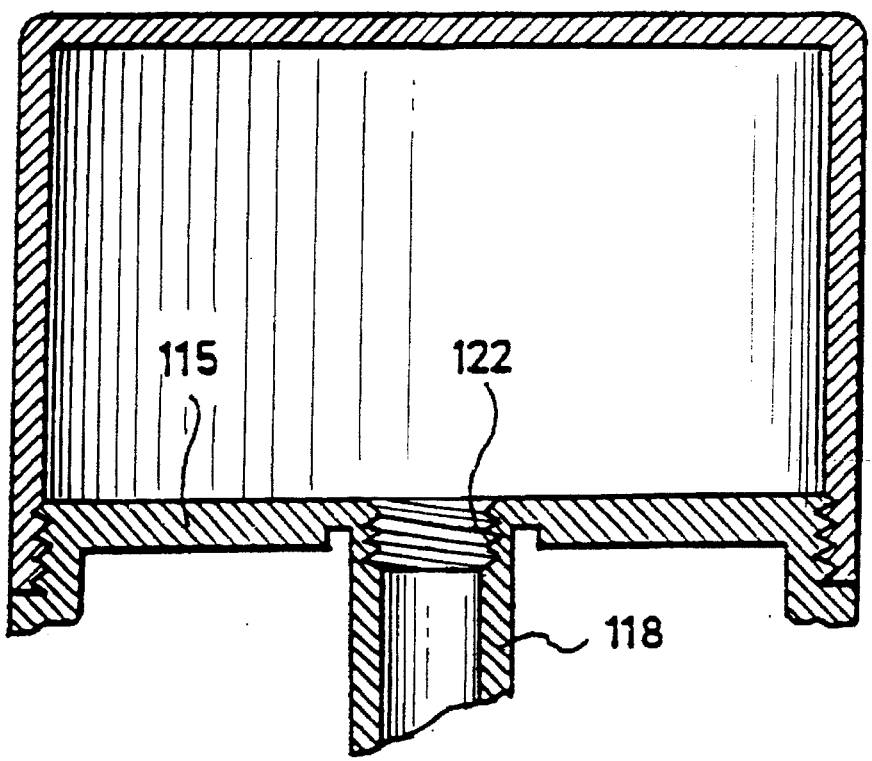
FIG. 10 shows a partial cross-sectional view of a sixth embodiment of a device according to the present invention.

Another modification of the device according to the present invention, the sixth embodiment, will be described with reference to FIGS. 10 and 11. The design of the device, shown in FIGS. 10 and 11, correspond to the design of previous devices, except the design of the grease receiving space and the grease container. In the device of FIGS. 10 and 11 in contrast to that of FIGS. 1a, instead of ring 22 with a sharp edge 23 which is screwed or glued on the tubular member 18 and is shown in FIG. 1a, the tubular member 118 itself is provided with an inner thread 122 for connecting the tubular member 118 with the grease container 110 shown in FIG. 11.

The grease-containing sack 110 is formed, as the sack 10 of FIG. 1a, of polyethylene. However, the sack 110 is not completely closed but is provided with a cylindrical extension 112 which projects from the bottom 111 of the sack 110. The extension 112 is provided with an outer thread 113 which cooperates with the thread 122 of the tubular member 118 for securing the sack 110 thereto.

The advantage of this design consists in that it can be formed with a greater sealing tightness than that with the sack 10. The sealing tight connection of the sack to the tubular member 118 can be increased by providing respective sealing rings and/or sealing edges, which are conventionally used with threaded tube connections.

The design of the sack shown in FIG. 11 facilitates its transportation, because the extension 112 can be closed during transportation with a simple screw cup. This design of the grease container also facilitates its filling with grease in a filling apparatus provided with a corresponding thread for receiving the extension 112.

Further, the bottom 111 of the container 110 can be reinforced in comparison with the other parts thereof. The reinforced bottom would facilitate the container mounting.

In the device, partially shown in FIGS. 10 and 11, the turning of the motor off after each delivery stroke is effected by an end switch. Alternatively, a stepping motor can be used, which would rotate, upon receiving an appropriate pulse, until the push pin supporting gear rotates exactly 90°.

Instead of drives that include four push pins for displacing the transverse pin extending through a piston, a crank drive for displacing the piston to its upper dead position can be used. Such a crank drive can be used with an elongated transverse pin and with arranging the driving gear so that its axis extends perpendicular to the axis of the transverse pin.

In this case, only one push pin is mounted on the gear, with the one push pin being in its lower, initial position when the piston engages the stop surface provided in the limiting stop. With the rotation of the push pin driving gear, the push pin engages the transverse pin and lifts it, after rotating 180° in its upper position corresponding to the upper dead point of the piston. Then, the driving gear rotates a further 180° (or rotates in an opposite direction) and the push pin returns to its initial position.

Further, instead of one push pin, two or three push pins, offset relatively to each other by 180° or 120°, respectively, can be used, with the drive gear rotating by 180° or 120°, respectively.

Instead of the above-described crank drive, the use of conventional crank drives is also possible. With a conventional crank drive, a crank for displacing the piston is pivotally arranged relative to the crank pin secured to the drive gear.

Figure 12:
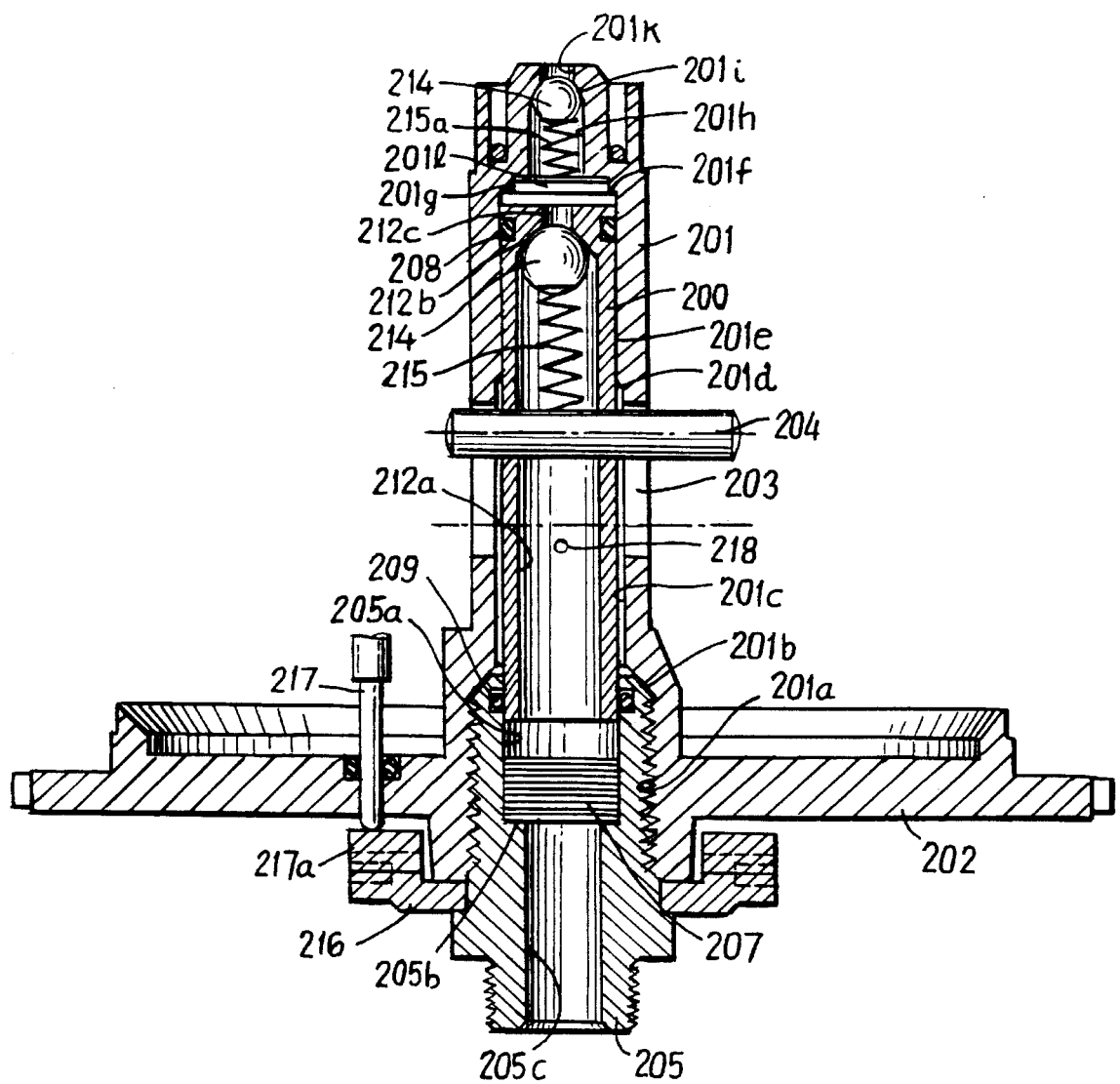
FIG. 12 shows a partial cross-sectional view of a seventh embodiment of a device according to the present invention.

FIG. 12 shows a modification of the device shown in FIG. 1a. FIG. 12 shows only elements different from those shown in FIG. 1a. The not shown elements are identical to respective elements of FIG. 1a.

In the embodiment of FIG. 12, a hollow cylindrical piston 200 is displaceable in a cylindrical tubular member 201. The cylindrical tubular member 201 is provided, in its lower region, with an increased diameter portion 201a, which is formed as a one-piece part with a plate 202. A transitional portion 201b of the tubular member 201 connects the increased diameter portion 201a with another portion 201c of the tubular member 201. A slotted opening 203 is formed in the portion 201c of the tubular member 201. The opening 203 accommodates up-and-down movement of a transverse pin 204 which is secured in the piston 200.

A further step 201d is provided in a region above the portion 201c and the opening 203. The step 201d connects the portion 201c of the tubular member 201 with a portion 201e of the tubular member. The diameter of the portion 201e is smaller than the diameter of the portion 201c. A still further step 201f connects a portion 201g of the tubular member 201 with the preceding portion 201e. The diameter of the portion 201g is smaller than that of the portion 201e.

Yet another step 201i connects a cylindrical portion 201k with the portion 201h, which forms an extension of the portion 201g and has a smaller diameter than the portion 201g. The diameter of the portion 201k is smaller than that of the portion 201h.

The lower portion 201a of the tubular member 201 has an inner thread which cooperates with an outer thread of an insert 205 for retaining the insert 205 in the tubular member 201. The insert 205 has a cylindrical shape and is provided with a bore, the diameter of which in the upper portion 205a of the insert 205, corresponds to the diameter of the portion 201c of the tubular member 201. A transitional step 201b connects the upper portion 205a of the insert 205 with the lower portion 205c.

A sleeve 207 is supported on the step 205b. The sleeve 207 is formed of a plurality of separate rings connected with each other. The sleeve 207 serves as a stop for the piston 200.

The piston 200 has a uniform outer diameter and is sealed with regard to the tubular member 201, with sealings 208 and 209 arranged in the upper and lower regions of the piston 200. A transverse bore for receiving the pin 204 is provided in the piston 200.

The piston 200 has a bore formed of a larger diameter portion 212a and a smaller diameter portion 212c, connected by a tapering portion 212b. The tapering portion 212b serves as a stop (seat) for a ball 214 which is biased against the tapering portion 212 by a helical spring 215. The spring 215 is supported on the pin 204.

In the device shown in FIG. 12, there is provided a second ball 214a which abuts the step 201i, likewise formed as a taper, and is biased against the step or taper 201i by another helical spring 215a.

A plate 216 is connected with the insert 205. The plate 216 extends substantially perpendicular to the axis of the piston 200 and the tubular member 201. An electrical contact pin 217 is supported in the plate 202 and cooperates with the plate 216. Rings 217a, which can have different thicknesses or heights, are fixedly secured to the plate 216, e.g., with screws or glue.

The device shown in FIG. 12 operates as follows:

The piston 200 is shown in FIG. 12 in its upper dead point position. Under the action of a spring, identical to spring 54 shown in FIG. 1a, the piston 200 moves downward, together with the pin 204. By the time the piston 200 moves downward, its interior, as will be explained further below, is completely filled with grease. When, by the action of the spring (not shown) on the pin 204 the piston 200 moves downward, grease, in the manner discussed in describing the operation of the device of FIG. 1a, is delivered to the lubrication point. The piston 200 moves downward until the lower end surface of the piston 200 abuts the sleeve 207, which limits the piston stroke.

The interior of the piston 200 defines a delivery chamber 218.

When the piston 200 moves downward, the ball 214 is biased against its seat 212b and the smaller diameter bore 212c of the piston 200 remains closed. As a result, a pressure in the suction chamber 201 of the tubular member 201 is reduced, and the ball 214a is lifted off its seat 201i, opening the bore in the portion 201k of the tubular member 201.

Because of the reduced pressure in the chamber 201l, the grease will flow into the chamber 201l. At the same time, the ball 214 remains biased against its seat 212b, preventing communication between the chamber 201 and the interior 218 of the piston 200. The grease contained in the interior 218 will flow through the bore of the insert 205 to the lubrication point. The delivery stroke ends when the lower end surface of the piston 200 engages the sleeve 207.

Upon the beginning of the next delivery stroke, the pin 204 will be displaced by a drive, similar to that described with reference to FIGS. 1a–3, upward, together with the piston 200. As a result of upward movement of the piston 200, the pressure in the suction chamber 201l increases, and the ball 214a will close the bore in the portion 201k of the tubular member 201.

Further, under the pressure in the suction chamber 201l, the ball 214 will be displaced against the biasing force of the spring 215, providing for flow of the grease from the chamber 201l into the interior 218 of the piston 200. As soon as the piston 200 reaches its upper deadpoint position, the process is repeated as it has already been described above.

The device shown in FIG. 12 has significant advantages.

As it has already been discussed above, a reliable delivery of grease having different viscosities presents a difficult problem. With the design according to the present invention, the delivery stroke (with the high viscosity of the grease) can be executed rather slowly and can last many minutes and even hours. As it follows from the foregoing discussion, the suction of the grease is effected with the same speed as the delivery stroke. This means that with slow delivery movement, the suction movement is also effected slowly, because the suction speed is always automatically adapted to the viscosity which determines the speed of the piston displacement.

Further, the inventive design insures that only so much grease flows into the suction chamber as necessary for delivering, with one delivery stroke to the lubrication point. The number of delivery strokes in a unit of time can be established by the selection of the thickness or height of the rings 217a.

The position of the indexing or control pin 217 is transmitted to the control unit which determines, in accordance with the reading of the control pin position, how many delivery strokes per day are required—one, two, three or more.

In this embodiment, as well as in previous embodiments, the delivery amount per unit of time, e.g., per day, is determined by elements securable to the member that connects the grease delivery device to the lubrication points. For example, when the device shown in FIG. 12 is replaced, the insert 205, together with the plate 216 and the ring 217a, remains at the lubrication point so that when a new lubricating device is mounted on the insert 205, the correct dose is established automatically.

A modification of a grease container according to the present invention will now be discussed with reference to FIG. 13.

Figure 13:
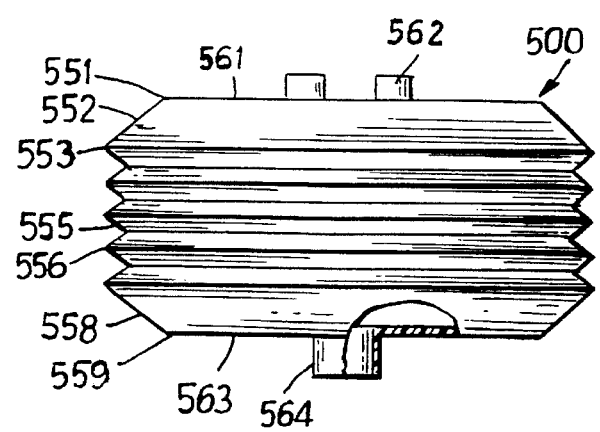
FIG. 13 shows a partially cross-sectional side view of another embodiment of a lubricant container for use in any of the devices of FIGS. 1–10.

The container or sack 500 shown in FIG. 13 is a symmetrical body formed of a plastic material, preferably polyethylene or the like. The container 500 has a smaller diameter at its upper end surface 561 than the diameter of the major portion of the container, and which diameter is designated with a reference numeral 551.

An outwardly tapering portion 552 of the container 500 extends from its upper end surface 561. The lower edge of the tapering portion 552 remote from the end surface 561, defines the outer diameter 553 of the container 500. A plurality of bellows-like portions extend from the lower edge. The bellows-like portions are defined by inner 555 and outer 556 diameters, with the outer diameter 556 being equal to the diameter 553.

The container 500 has three bellows-like portions. To the last, from the tapering portion 552, bellows-like portion, a second tapering portion 558 is connected which tapers inward, with the edge 559 of the tapering portion 558 remote from the bellows-like portion defining the diameter of the other end surface 563 of the container 500.

The diameter defined by the edge 559 is equal to the diameter 551. The end surfaces 551 and 563 of the container 500 are covered and sealingly closed by respective circular plates (not shown separately). The bottom closing plate is provided with a cylindrical tubular union 564, the interior of which communicates with the interior of the container.

The top closing plate is provided with projections 562 which serve for container displacement. They are not absolutely necessary and can be eliminated.

The container 500 functions as follows:

The container is completely filled with grease, and the bottom union is closed by a diaphragm or the like. The container is placed into the lubricating device, e.g., the device shown in FIG. 1a, which should be provided with a union connected with the device tubular member, and adapted to pierce the diaphragm that closes the container union. The device union may be formed somewhat like the ring 22 in FIG. 1a. However, it need not necessarily be provided with the cutting edge.

The container 500, alternatively, can be provided with a bottom cover and be connected to the lubrication device by the union 564 being pushed into a union of a larger diameter, which communicates with the interior of the device tubular member.

When the container is emptied, the bellows-like portions of the container will be compressed, with the volume of the container being reduced. The container of FIG. 13, on one hand, is very stable and, thus, provides a reliable means for storing and transporting grease, and on the other side, its rigidity is such that it presents only a small resistance to deformation during the delivery process.

It is to be pointed out that, while conventional gas discharge-driven grease boxes are thrown away after use, the lubricating device according to the invention can be used repeatedly. This reduces the quantity of waste. Further, because the device is electrically operated, no release of any chemicals takes place.

Though the present invention has been shown and described with reference to preferred embodiments, various modifications thereof will be apparent to those skilled in the art and, therefore, it is not intended that the invention be limited to the disclosed embodiments and/or details thereof, and departures may be made therefrom within the spirit and scope of the appended claims.

What is claimed is:

1. A device for metered delivery of one of a liquid substance and a viscous substance to a consumption point, said device comprising:

a container for receiving an amount of the one of a liquid substance and a viscous substance;

delivery means comprising a chamber for receiving said container, and a displacement element displaceable between first and second positions for enabling flow of the one substance from said container to the consumption point;

drive means for displacing said displaceable element between the first and second positions;

connection means, which is separate from said delivery means and is securable to the consumption point for communicating said delivery means with the consumption point, said connection means including an indicator indicating a predetermined amount of the one substance to be delivered to the consumption point in a unit of time; and control means for controlling operation of said drive means, in accordance with information provided by said indicator, so that the predetermined amount of the one substance is delivered to the consumption point in the unit of time.

2. A device as set forth in claim 1, wherein said indicator comprises means for indicating a number of actuation of said drive means in the unit of time.

3. A device as set forth in claim 1, wherein said indicator comprises means for indicating a volume of the one substance to be delivered to the consumption point at each actuation of said drive means.

4. A device as set forth in claim 1, wherein said indicator comprises first means for indicating a time interval between two successive actuation of said drive means, and second means for indicating a displacement volume of said displacement element per each actuation of said drive means.

5. A device as set forth in claim 1, wherein said displacement element comprises a piston, and said delivery means further comprises a return spring for biasing said piston to the first position, said return spring being displaceable between first and second positions corresponding to the first and second positions of said piston and said return spring, and said return spring applying to said piston a first biasing force in the first position of said piston and a second biasing force in the second position of said piston, the second biasing force being substantially bigger than the first biasing force and sufficient enough for insuring delivery of the one substance to the consumption point.

6. A device as set forth in claim 1, further comprising a valve for delivering the one substance from said container and opening upon a pressure in said container reaching a predetermined threshold.

7. A device as set forth in claim 5, further comprising a cylinder member through which the one substance flows to the consumption point, said piston being displaceable in said cylinder member, and said piston reducing a volume of said cylinder when displacing from the second position to the first position, whereby the one substance is delivered to the consumption point.

8. A device as set forth in claim 5, wherein said indicator includes stop means engageable by said piston in the first position thereof, and defining an amount of the one substance to be delivered to the consumption point per one stroke of said piston.

9. A device as set forth in claim 5, wherein said drive means comprises an electric motor for actuating said drive means and motion-transmitting means connecting said electric motor with said piston and said return spring.

10. A device as set forth in claim 9, further comprising an element cooperating with said motion-transmitting means for displacing said piston and said return spring from the first position thereof to the second position thereof, said motion-transmitting means comprising a rotatable disc having at least one cam element cooperating with said displacing element for displacing said piston and said return spring from the first position to the second position thereof upon rotation of said disc.

11. A device as set forth in claim 10, wherein said rotatable disc has four cam elements thereon arranged at 90° relative to each other, and cooperating with said displacing elements for displacing said piston and said return spring from the first position thereof to the second position thereof.

12. A device as set forth in claim 10, wherein said displacing element and said one cam element are so arranged that said piston is always displaced in the second position thereof, independent of a position defining the first position of said piston.

13. A device as set forth in claim 10, wherein said motion-transmission means comprises a multi-stage gear drive connecting said electric motor with said disc.

14. A device as set forth in claim 1, wherein said container comprises a substantially cylindrical flexible sack for receiving the one substance.

15. A device as set forth in claim 14, further comprising a tubular member for connecting said sack and the consumption point, and having a sharp edge for piercing said sack to provide for flow of the grease from said sack to the consumption point.

16. A device as set forth in claim 14, wherein said sack includes thread means engaging respective thread means provided on a tubular member for connecting said sack with said tubular member.

17. A device as set forth in claim 1, further comprising indexing means for controlling operation of said control means, said indicator comprising a projection formed on said connection means and cooperating with said indexing means to provide for the operation of said control means such that delivery of the predetermined amount of the one substance per the unit of time is insured.

18. A device as set forth in claim 1, wherein said delivery means comprises a cylinder, and said displacement element comprises a hollow piston having a bore, through which the one substance flows to the consumption point, and a valve for closing said bore, said piston being displaceable in said cylinder and reducing a volume of said cylinder when being displaced from the second position to the first position, whereby the one substance flow to the consumption point.

19. A device as set forth in claim 18, wherein said piston, upon being displaced from the first position to the second position, insures suction of the one substance into said cylinder.

20. A device as set forth in claim 1, wherein said container comprises:

a substance-receiving vessel formed as an axially symmetrical body and of a deformable plastic material and having a side wall; and top and bottom covers for closing said side wall, said bottom cover having a union through which the one substance can flow from said vessel.

21. A container as set forth in claim 20, wherein said top and bottom covers are displaceable toward each other upon the flow of the one substance from said vessel.

22. A container as set forth in claim 20, wherein said side wall is formed at least partially as a bellows-like member.

23. A container as set forth in claim 20, wherein said plastic material is polyethylene.

* * * * *